United States Patent
Martling et al.

(10) Patent No.: US 7,269,957 B2
(45) Date of Patent: Sep. 18, 2007

(54) COMBUSTION LINER HAVING IMPROVED COOLING AND SEALING

(76) Inventors: Vincent C. Martling, 10296 Sandy Run Rd., Jupiter, FL (US) 33478; Zhenhua Xiao, 195 Lone Pine Dr., Palm Beach Gardens, FL (US) 33420

( * ) Notice: Subject to any disclaimer, the term of this patent is extended or adjusted under 35 U.S.C. 154(b) by 634 days.

(21) Appl. No.: 10/857,713

(22) Filed: May 28, 2004

(65) Prior Publication Data

US 2005/0262845 A1    Dec. 1, 2005

(51) Int. Cl.
*F23R 3/60* (2006.01)

(52) U.S. Cl. .......................... 60/800; 60/752

(58) Field of Classification Search .................. 60/722, 60/752, 754, 796, 800; 431/343
See application file for complete search history.

(56) References Cited

U.S. PATENT DOCUMENTS

| | | | |
|---|---|---|---|
| 5,724,816 A | 3/1998 | Ritter et al. | |
| 5,964,091 A * | 10/1999 | Fukui et al. | 60/752 |
| 6,334,310 B1 | 1/2002 | Sutcu et al. | |
| 6,427,446 B1 * | 8/2002 | Kraft et al. | 60/737 |
| 7,082,770 B2 * | 8/2006 | Martling et al. | 60/796 |

FOREIGN PATENT DOCUMENTS

JP    8-285284    * 11/1996

* cited by examiner

*Primary Examiner*—L. J. Casaregola

(57) ABSTRACT

A gas turbine combustion liner is disclosed having an alternate interface region between it and a transition duct where the cooling effectiveness along the aft end of the combustion liner is improved, resulting in extended component life, while utilizing a simpler combustion liner geometry. The region of the combustion liner proximate its second end comprises a plurality of spring seals that seal against a transition duct while admitting a cooling fluid to pass into a passage, formed between the combustion liner and spring seals, that feeds a plurality of cooling holes located in the combustion liner proximate the liner second end. Depending on the cooling requirements, the cooling holes can be angled both axially and circumferentially to maximize the cooling effectiveness.

20 Claims, 5 Drawing Sheets

COMBUSTION LINER HAVING IMPROVED COOLING AND SEALING

TECHNICAL FIELD

This invention relates in general to gas turbine engines and more specifically to the cooling and sealing arrangement of the aft end of a combustion liner.

BACKGROUND OF THE INVENTION

A gas turbine engine typically comprises at least one combustor, which mixes air from a compressor with a fuel. This fuel and air mixture combusts after being introduced to an ignition source. The resulting hot combustion gases pass through the combustion system and into a turbine, where the gases turn the turbine and associated shaft. A gas turbine engine is most commonly used for either propulsion for propelling a vehicle or harnessing the rotational energy from the engine shaft to drive a generator for producing electricity. Most land-based gas turbine engines employ a plurality of combustors arranged in a can-annular layout around the engine. Referring to FIG. 1, a representative land based gas turbine engine 10 of the prior art is shown in partial cross section. Gas turbine engine 10 comprises an inlet region 11, an axial compressor 12, a plurality of combustors 13, each in fluid communication with a transition duct 14, which are in fluid communication with a turbine 15. The hot combustion gases drive the turbine, which turns shaft 17 before exiting through outlet 16. Shaft 17 is coupled to the compressor, and for power generation, to an electrical generator (not shown).

The operating temperatures of the combustors 13 are typically well over 3000 degrees Fahrenheit, while the temperature limits of the materials comprising combustors 13 are much lower. Therefore, in order to maintain the structural integrity for continued exposure to the hot combustion gases, combustors 13 are cooled, typically by air from compressor 12. However, it is critical to only use the minimal amount of cooling air necessary to lower the operating metal temperatures of combustor 13 to within the acceptable range, and not use more air than necessary nor allow any cooling air leakage.

In order to maximize the efficiency of the gas turbine engine, it is imperative to minimize any leakage of air from compressor 12 that is not intended for cooling combustors 13, such that all air not intended for cooling, passes through combustors 13 and undergoes combustion. Leakage areas are especially common between mating components such as the interface region between combustor 13 and transition duct 14. Seals or tight tolerances between such mating components are typically employed to overcome such leakages that can reduce overall performance and efficiency. However, it is also imperative to provide adequate cooling to an interface region.

Examples of prior art seals and cooling designs for the interface region between combustor 13 and transition duct 14 are disclosed in U.S. Pat. Nos. 5,724,816 and 6,334,310. The '816 patent pertains to a plurality of axial channels that are formed between an inner member and an outer member and can be used to cool the aft end section of a combustion liner where it interfaces with a transition duct. An example of this configuration is shown in FIG. 2 where a combustion liner is provided having a plurality of axial cooling channels 18. The '310 patent pertains to an alternate manner to cool this same region of a combustion liner and can be used in conjunction with the prior art combustion liner shown in FIG. 2. Specifically, a combustion liner includes an outer cooling sleeve that contains a plurality of cooling holes 19 for supplying cooling air to the region between the liner and the outer cooling sleeve. The outer cooling sleeve includes a swaged end such that when the outer cooling sleeve is welded to the combustion liner the stresses imparted to the outer cooling sleeve by a transition duct are moved away from the weld joint. Often times these combustion liners are also accompanied by at least one spring seal for sealing against the inner wall of a transition duct.

While each of these designs are directed towards providing adequate cooling at the interface region of a combustion liner and transition duct, improvements can be made such that cooling effectiveness is improved, extending component life, while simultaneously minimizing unnecessary cooling air leakage.

SUMMARY AND OBJECTS OF THE INVENTION

The present invention seeks to provide a combustion liner having an alternate interface region between it and a transition duct where the cooling effectiveness along the aft end of the combustion liner is improved, resulting in extended component life, while accomplishing this utilizing a simpler combustion liner geometry. The combustion liner comprises a first end, a second end, and is formed from three portions, with the third portion fixed proximate the second end and comprising an inner liner wall, an outer liner wall, a first spring seal adjacent to the outer liner wall, a second spring seal adjacent the first spring seal, and a plurality of cooling holes extending from the outer liner wall to the inner liner wall. Each of the first and second spring seals contain a plurality of axial slots with the slots preferably offset circumferentially. The second spring seal is positioned over the first spring seal to control the amount of cooling air passing through the plurality of first axial slots. Cooling air then passes over the outer liner wall and through the cooling holes, which are preferably angled both axially and circumferentially to maximize the length of the cooling hole, before providing cooling to the inner liner wall.

It is an object of the present invention to provide a combustion liner having an interface region with a transition duct that has improved cooling effectiveness.

It is another object of the present invention to provide a simplified geometry for the aft end region of a combustion liner.

In accordance with these and other objects, which will become apparent hereinafter, the instant invention will now be described with particular reference to the accompanying drawings.

DETAILED DESCRIPTION OF THE PREFERRED EMBODIMENT

Figure 1:
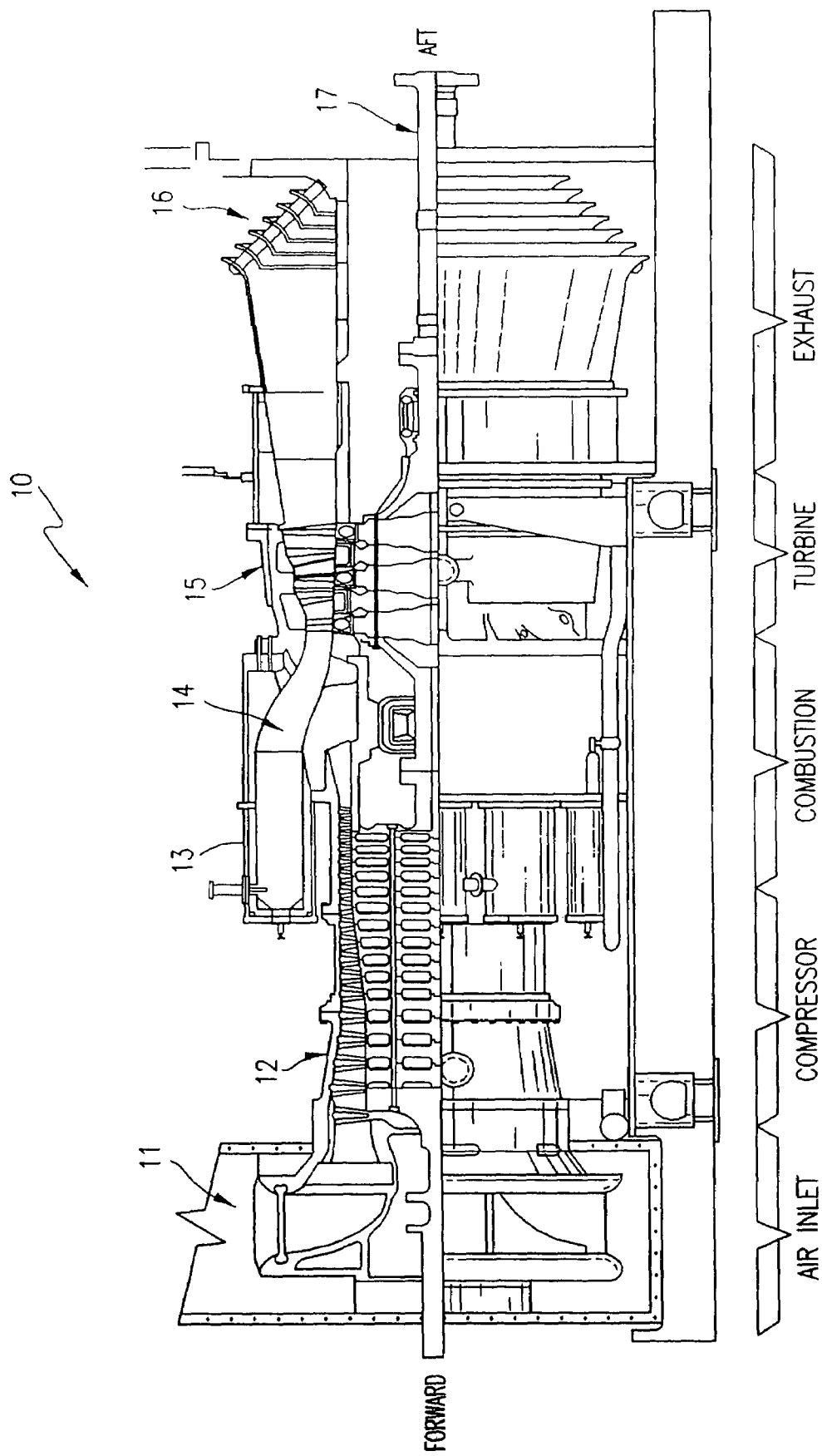
FIG. 1 is a partial cross section of a gas turbine engine of the prior art.
Figure 2:
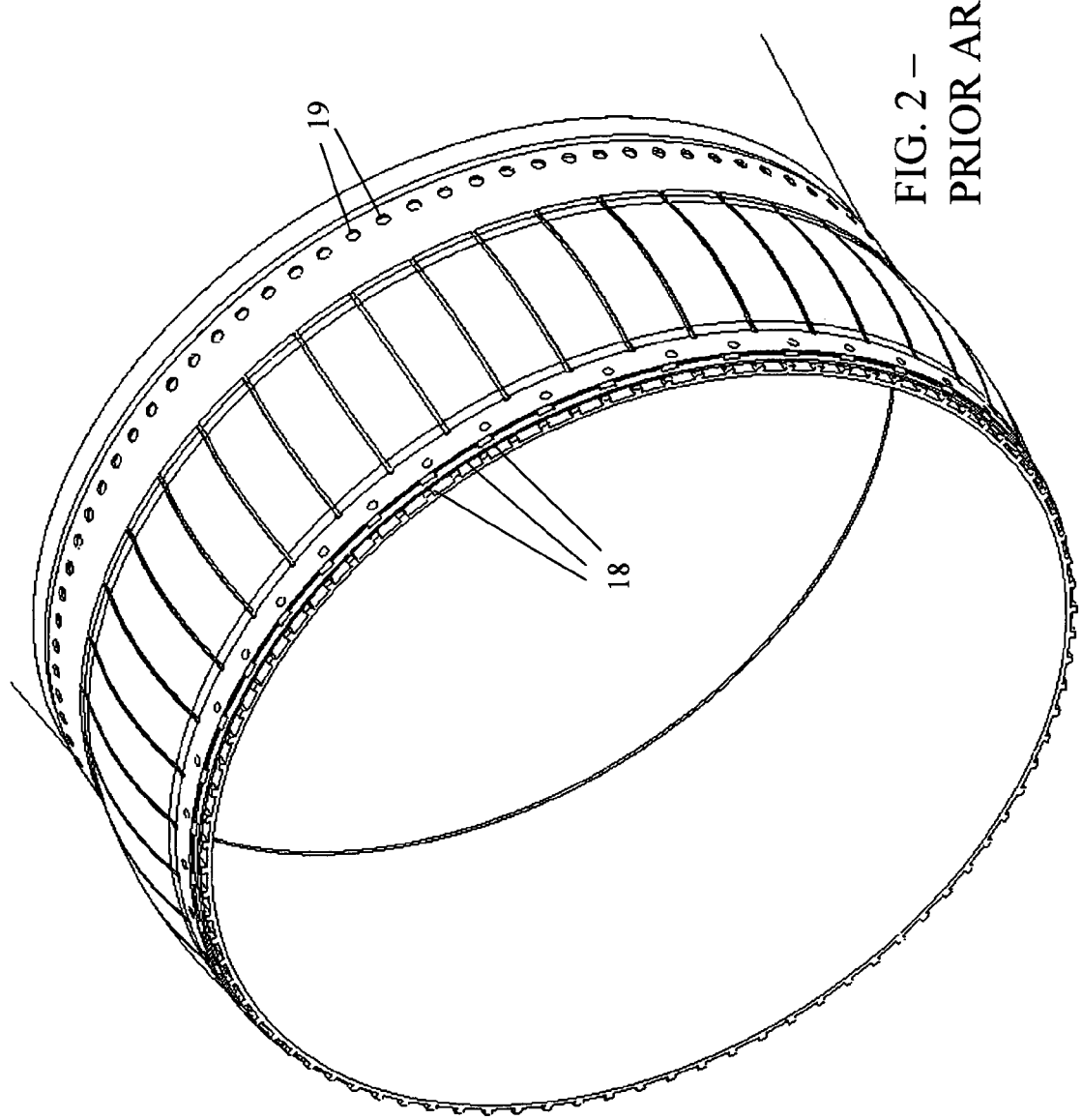
FIG. 2 is a perspective view of a portion of a prior art combustion liner.
Figure 3:
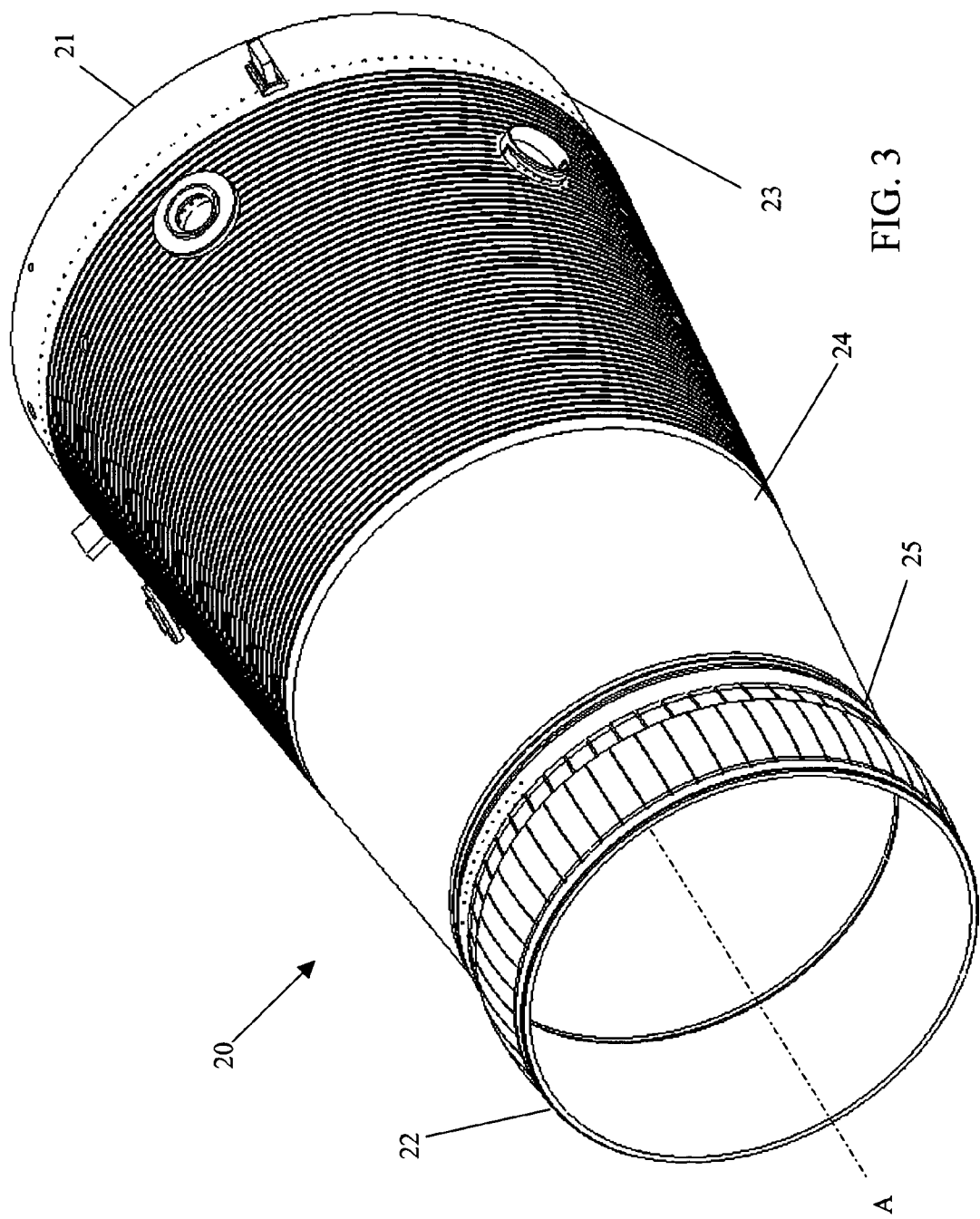
FIG. 3 is a perspective view of a combustion liner in accordance with the preferred embodiment of the present invention.
Figure 4:
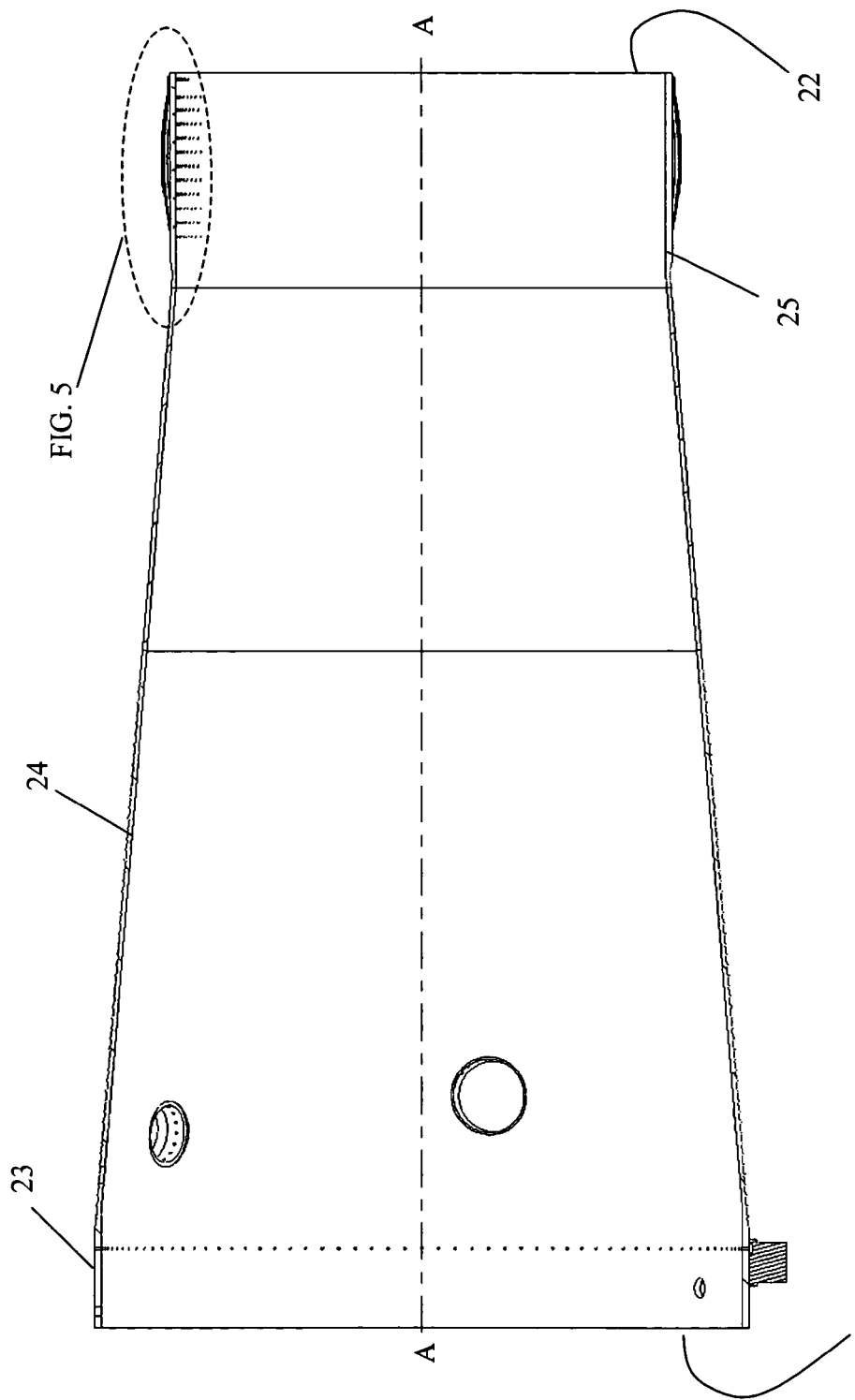
FIG. 4 is a cross section of a combustion liner in accordance with the preferred embodiment of the present invention.

The preferred embodiment of the present invention is shown in detail in FIGS. 3-6. Referring now to FIG. 3, combustion liner 20 is shown in perspective view with emphasis on its aft region, which interfaces with a transition duct similar to that of transition duct 14 in FIG. 1. Combustion liner 20 comprises a first end 21, a second end 22, and a centerline A-A. Located proximate first end 21 is a first portion 23 that is generally cylindrical in shape. Fixed to first portion 23 and extending towards second end 22 is a second portion 24. Depending on the volume of fuel and air and required flow velocities through combustion liner 20, second portion 24 may be either generally cylindrical or generally conical. FIG. 4 reflects a generally conical shape to second portion 24. A third portion 25 is fixed to second portion 24 opposite first portion 23 and proximate second end 22. Third portion 25 is shown in greater detail in FIG. 5 and comprises an inner liner wall 26 and outer liner wall 27 in spaced relation to form a liner wall thickness 28.

Located adjacent outer liner wall 27 is a first spring seal 29 that has a first length 30 and a plurality of first axial slots 31 with each of first axial slots 31 having a first width 32. Located adjacent first spring seal 29 is a second spring seal 33 that has a second length 34 and a plurality of second axial slots 35 with each of second axial slots 35 having a second width 36. First spring seal 29 and second spring seal 33 are primarily used as a sealing system when combustion liner 20 is installed in a transition duct. It is preferred that first and second spring seals, 29 and 33, are fixed to combustion liner 20 proximate second end 22 such that potential damage to seals 29 and 33 during installation of combustion liner 20 in a transition duct is minimized. Further characteristics of the spring seal arrangement have first length 30 of first spring seal 29 greater than second length 34 of second spring seal 33 and first width 32 being greater than second width 36 in order to accommodate the necessary circumferential movement of the spring seals as they are compressed during installation in a transition duct while not preventing the necessary flow of cooling fluid through this region. However, second spring seal 33 is offset circumferentially from first spring seal 29 in order to reduce the leakage of cooling fluid through second spring seal 33.

The spring seals form a generally annular passage 38 around a portion of outer liner wall 27. A cooling fluid, such as air, enters passage 38 through first plurality of axial slots 31 in first spring seal 29. Located in third portion 25 of combustion liner 20 is a plurality of cooling holes 37 that extend from outer liner wall 27 to inner liner wall 26. The cooling fluid from passage 38 flows through cooling holes 37 for providing both effective film cooling along inner liner wall 26 and convective cooling throughout thickness 28. Depending on the amount of cooling or area requiring cooling the quantity, location, and size of cooling holes 37 can vary. Due to the drop in cooling fluid pressure across cooling holes 37 the flow of cooling fluid 37 is regulated by cooling hole size, not the dimensions of axial slots 31 and 35.

Figure 6:
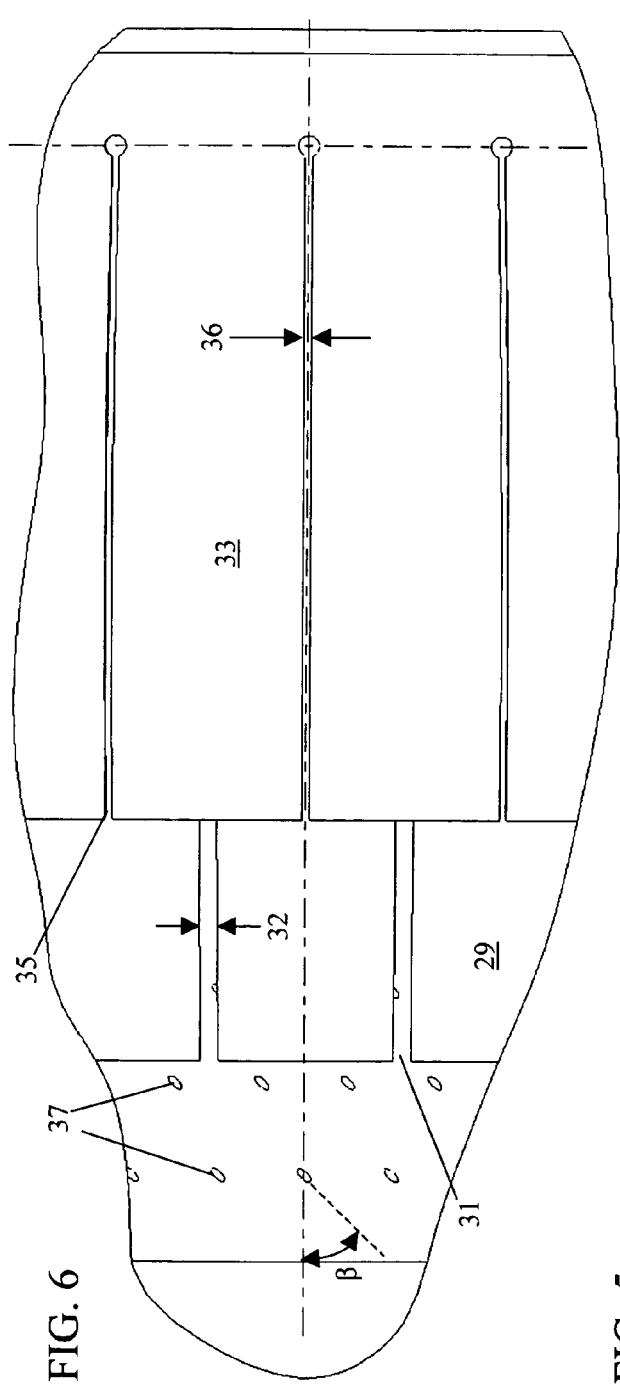
FIG. 6 is a top view of a portion of a combustion liner in accordance with the preferred embodiment of the present invention.
Figure 5:
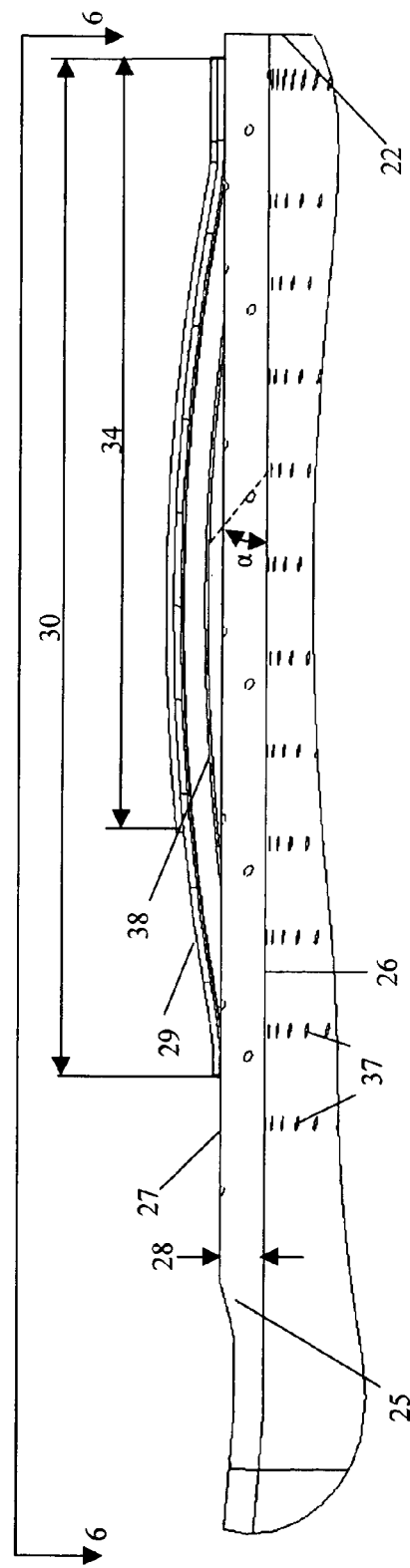
FIG. 5 is a detailed cross section of a portion of a combustion liner in accordance with the preferred embodiment of the present invention.

Referring now to FIGS. 5 and 6, in order to maximize the effectiveness of the cooling fluid passing through cooling holes 37, the cooling holes are preferably oriented generally towards second end 22 at a first angle α relative to outer liner wall 27. Depending on the amount of cooling required, first angle α ranges between 10 and 75 degrees. To further enhance the effectiveness of the cooling through cooling holes 37, the cooling holes are further oriented in a generally circumferential direction at a second angle β relative to centerline A-A. Depending on the amount of cooling required, second angle β is up to 80 degrees while cooling holes 37 have a hole diameter between 0.015 and 0.125 inches.

The preferred embodiment of the present invention is advantageous since it can be easily tailored to a variety of cooling requirements while simultaneously eliminating the outer member of the prior art configuration and reducing machining requirements. The amount of cooling fluid admitted into passage 38 from first axial slots 31 is controlled as desired by adjusting the pressure drop across cooling holes 37 by altering the size of cooling holes 37. Furthermore, these adjustments to cooling hole sizes also regulate the amount of cooling through wall thickness 28 and along inner liner wall 26.

While the invention has been described in what is known as presently the preferred embodiment, it is to be understood that the invention is not to be limited to the disclosed embodiment but, on the contrary, is intended to cover various modifications and equivalent arrangements within the scope of the following claims.

The invention claimed is:

1. A combustion liner for a gas turbine engine, said combustion liner comprising:
   a centerline;
   a first end;
   a second end;
   a first cylindrical portion proximate said first end;
   a second portion fixed to said first portion and extending towards said second end;
   a third cylindrical portion fixed to said second portion proximate said second end, said third portion comprising:
      an inner liner wall;
      an outer liner wall;
      a first spring seal adjacent to said outer liner wall and having a first length and a plurality of first axial slots, with each of said first axial slots having a first width;
      a second spring seal adjacent to said first spring seal and having a second length and a plurality of second axial slots, with each of said second axial slots having a second width; and,
      a plurality of cooling holes extending from said outer liner wall to said inner liner wall.

2. The combustion liner of claim 1 wherein said second portion is generally conical.

3. The combustion liner of claim 1 wherein said second portion is generally cylindrical.

4. The combustion liner of claim 1 wherein said first length is greater than said second length.

5. The combustion liner of claim 1 wherein said first width is greater than said second width.

6. The combustion liner of claim 1 wherein said cooling holes have a hole diameter between 0.015 and 0.125 inches.

7. The combustion liner of claim 1 wherein said cooling holes are oriented generally towards said second end at a first angle α relative to said outer wall.

8. The combustion liner of claim 7 wherein said first angle α is between 10 and 75 degrees.

9. The combustion liner of claim 7 wherein said cooling holes are further oriented in a generally circumferential direction at a second angle β relative to said centerline.

10. The combustion liner of claim 9 wherein said second angle β is up to 80 degrees.

11. The combustion liner of claim 1 wherein said first and second spring seals are fixed to said combustion liner proximate said second end of said combustion liner.

12. The combustion liner of claim 1 wherein a cooling fluid passes through said first axial slots, into an annular plenum formed between said outer liner wall of said combustion liner and said first spring seal, and through said cooling holes.

13. A combustion liner for a gas turbine engine, said combustion liner comprising:
- a centerline;
- a first end;
- a second end;
- a first cylindrical portion proximate said first end;
- a second generally conical portion fixed to said first portion and extending towards said second end;
- a third cylindrical portion fixed to said second portion proximate said second end, said third portion comprising:
  - an inner liner wall;
  - an outer liner wall;
  - a first spring seal adjacent to said outer liner wall and having a first length and a plurality of first axial slots, with each of said first axial slots having a first width;
  - a second spring seal adjacent to said first spring seal and having a second length and a plurality of second axial slots, with each of said second axial slots having a second width; and,
  - a plurality of cooling holes extending from said outer liner wall to said inner liner wall, said cooling holes oriented generally towards said second end at a first angle α relative to said outer wall and in a generally circumferential direction at a second angle β relative to said centerline.

14. The combustion liner of claim 13 wherein said first length is greater than said second length.

15. The combustion liner of claim 13 wherein said first width is greater than said second width.

16. The combustion liner of claim 13 wherein said cooling holes have a hole diameter between 0.015 and 0.125 inches.

17. The combustion liner of claim 13 wherein said first angle α is between 10 and 75 degrees.

18. The combustion liner of claim 17 wherein said second angle β is up to 80 degrees.

19. The combustion liner of claim 13 wherein said first and second spring seals are fixed to said combustion liner proximate said second end of said combustion liner.

20. The combustion liner of claim 13 wherein a cooling fluid passes through said first axial slots, into an annular plenum formed between said outer liner wall of said combustion liner and said first spring seal, and through said cooling holes.

* * * * *